US008889066B2

(12) United States Patent
Hoberg et al.

(10) Patent No.: US 8,889,066 B2

(45) Date of Patent: Nov. 18, 2014

(54) IRON-NICKEL ALLOY WITH A HIGH LEVEL OF DUCTILITY AND A LOW EXPANSION COEFFICIENT

(75) Inventors: Bernd Hoberg, Werdohl (DE); Bernd De Boer, Altena (DE)

(73) Assignee: Outokumpu VDM GmbH, Werdohl (DE)

( * ) Notice: Subject to any disclaimer, the term of this patent is extended or adjusted under 35 U.S.C. 154(b) by 691 days.

(21) Appl. No.: 12/312,935

(22) PCT Filed: Oct. 20, 2007

(86) PCT No.: PCT/DE2007/001875

§ 371 (c)(1), (2), (4) Date: Jun. 1, 2009

(87) PCT Pub. No.: WO2008/064624

PCT Pub. Date: Jun. 5, 2008

(65) Prior Publication Data

US 2010/0086433 A1 Apr. 8, 2010

(30) Foreign Application Priority Data

Dec. 2, 2006 (DE) ......................... 10 2006 056 932

(51) Int. Cl.

| | |
|---|---|
| ***C22C 38/52*** | (2006.01) |
| ***C22C 30/00*** | (2006.01) |
| ***C22C 38/44*** | (2006.01) |
| ***C22C 38/48*** | (2006.01) |
| ***B23K 9/16*** | (2006.01) |
| ***B23K 10/02*** | (2006.01) |

(52) U.S. Cl.

USPC ........... 420/95; 420/586; 219/75; 219/121.46

(58) Field of Classification Search

USPC .......................... 420/95, 586; 219/75, 121.46

See application file for complete search history.

(56) References Cited

U.S. PATENT DOCUMENTS

| | | | | |
|---|---|---|---|---|
| 1,794,983 | A * | 3/1931 | Ritter | 219/145.1 |
| 3,184,577 | A | 5/1965 | Witherell | |
| 3,514,284 | A | 5/1970 | Eiselstein | |
| 3,573,897 | A | 4/1971 | Wache | |
| 3,647,426 | A | 3/1972 | Wache | |
| 3,971,677 | A | 7/1976 | Mason et al. | |
| 4,219,224 | A * | 8/1980 | Hanley | 285/47 |
| 4,795,076 | A | 1/1989 | Gottschild | |
| 4,932,581 | A | 6/1990 | Ohle et al. | |
| 6,605,163 | B2 | 8/2003 | Cozar et al. | |
| 6,624,387 | B1 * | 9/2003 | Tischler | 219/129 |

FOREIGN PATENT DOCUMENTS

| | | |
|---|---|---|
| AT | 246517 | 4/1966 |
| AU | 6569900 | 4/2001 |
| DE | 1260278 | 2/1968 |
| DE | 1558714 | 4/1970 |
| DE | 2351234 | 4/1975 |
| DE | 3222292 | 12/1982 |
| DE | 36 41 873 | 8/1987 |
| DE | 37 27 343 | 3/1989 |
| DE | 69125684 | 11/1997 |
| DE | 19944578 | 3/2001 |
| EP | 0482889 | 4/1992 |
| FR | 2 819 825 | 7/2002 |
| FR | 2 855 185 | 11/2004 |
| JP | 55-122855 | 9/1980 |
| JP | 57-207160 | 12/1982 |
| JP | 60-159151 | 8/1985 |
| JP | 60-221193 | 11/1985 |
| JP | 4-180542 | 6/1992 |
| JP | 4-202642 | 7/1992 |
| JP | 10-017997 | 1/1998 |
| JP | 11-104885 | 4/1999 |
| JP | 2001-131706 | 5/2001 |
| JP | 2002-105599 | 4/2002 |

OTHER PUBLICATIONS

Rahn, Armin: The Basics of Soldering, John Wiley & Sons, Inc., New York, 1993, S. 64-69, ISBN 0-471-58471-1.

Kollenberg, Wolfgang (Hrsg.): Technische Keramik, Vulkan Verlag, Essen, 2004 ISBN 978-3-8027-297-0.

* cited by examiner

*Primary Examiner* — Jessee Roe

(74) *Attorney, Agent, or Firm* — Jordan and Hamburg LLP

(57) ABSTRACT

The invention relates to a solid-solution strengthened iron-nickel alloy with a high level of ductility and an expansion coefficient $<5\times10^{-6}$/K in the temperature range between room temperature and −200° C. Said alloy consists of (in wt. %): between 0.005 and 0.05% of C; <0.02% of S; between 1 and 2% of Cr; between 35 and 38% of Ni; between 0.3 and 1.5% of Mn; <0.5% of Si; between 1.0 and 3.5% of ΣMo+W; between 0.2 and 1.0% of Ti; between 0.2 and 1.0% of Nb; <0.02% of P; and between 1.0 and 4.0% of Co; Fe constituting the remainder, in addition to production-related impurities.

17 Claims, 1 Drawing Sheet

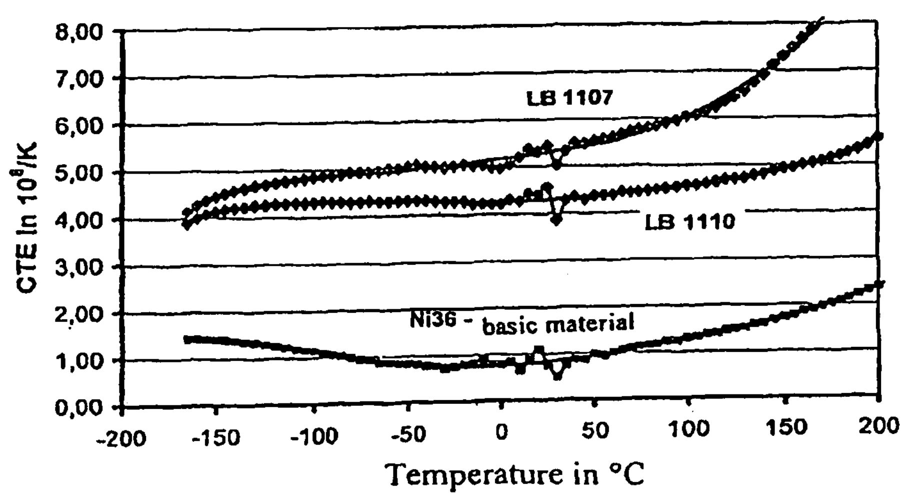
8,00
7,00
6,00
5,00
4,00
3,00
2,00
1,00
0,00
CTE In $10^{6}$/K
LB 1107
LB 1110
Ni36 - basic material
-200
-150
-100
-50
0
50
100
150
200
Temperature in °C

IRON-NICKEL ALLOY WITH A HIGH LEVEL OF DUCTILITY AND A LOW EXPANSION COEFFICIENT

BACKGROUND OF THE INVENTION

The invention relates to a solid solution-strengthened iron-nickel alloy having a high level of ductility and a low expansion coefficient in the low temperature range.

JP-A 60221193 discloses an iron-nickel alloy having the following composition (in weight %):

C <0.2%
S <0.006%
Ni 35-37%
Mn 1-3%
Si <0.1%
Ti 0.2-0.5%
P <0.02%
Fe Remainder, including production-related impurities.

This alloy can be used as a welding filler material for Ni 36 alloys.

DE-T 69125684 provides an alloy having the following composition (in weight %):

C 0.1-0.35%
S 0-0.05%
Cr 0-2%
Ni 31-45%
Mn 0-2.5%
Si 0-1%
Al 0-0.5%
Ti 0-0.75%
Nb 0.1-4%
P 0-0.05%
Fe Remainder and production-related impurities.

This describes a welding material that has a low expansion coefficient.

Due to their chemical composition, the alloys in this prior art cannot necessarily also be used in the low temperature range, for instance between room temperature and at least −165° C., so that appropriate modifications to the chemical composition are necessary.

If welding is performed using an iron alloy having 36% Ni (Ni36) using similar conventional, commercially-available filler materials, then the welded joint will not be as strong as the basic material, regardless of the welding process. In the overwhelming majority of uses in the temperature range above 0° C. this is not a major disadvantage because the mechanical properties play only a subordinate role. This is in contrast to the coefficient of thermal expansion, which as is known is particularly low with this iron-nickel alloy.

SUMMARY OF THE INVENTION

The object of the invention is to provide an alloy for low temperature applications, in particular in the range ≤−165, that has good mechanical properties in addition to a low coefficient of thermal expansion, the alloy also being easily weldable.

This object is attained on the one hand using a solid solution-strengthened iron-nickel alloy that has a high level of ductility and an expansion coefficient $<5\times10^{-6}$/K in the temperature range between room temperature and −200° C., comprising (in weight %):

C 0.005-0.05%
S <0.02%
Cr 1-2%
Ni 35-38%
Mn 0.3-1.5%
Si <0.5%
ΣMo+W 1.0-3.5%
Ti 0.2-1.0%
Nb 0.2-1.0%
P <0.02%
Co 1.0-4.0%
Fe Remainder and production-related impurities.

This object is also attained using a solid solution-strengthened iron-nickel alloy with a high level of ductility and an expansion coefficient $<5\times10^{-6}$/K in the temperature range between room temperature and −200° C., comprising (in weight %):

C 0.005-0.05%
S <0.02%
Cr 1-2%
Ni 35-38%
Mn 0.3-1.5%
Si <0.5%
Al 0.8-2.0%
Ti 0.2-1.0%
Nb 0.2-1.0%
P <0.02%
Co 1.0-4.0%
Fe Remainder and production-related impurities.

Thus the inventive subject-matter provides two alloys that are independent of one another but that act essentially the same in the low temperature range and that are distinguished from one another essentially in that Mo+W (Variant 1) are used in the first alloy and Al (Variant 2) is used in the second alloy, the composition of the alloys remaining essentially the same otherwise. The inventive alloys are can preferably be employed as a welding filler material for applications in the low temperature range to less than −196° C., in particular for iron-nickel basic materials that have low thermal expansion coefficients.

It is of particular advantage that the low temperature strength values for the welding material are provided above those values for binary iron-nickel alloys having Ni contents between 32 and 42%.

The inventive alloys can be mechanically linked by MSG, WIG, or plasma welding to a basic material that is based on an iron-nickel alloy that has a low expansion coefficient.

One special application of the inventive alloys is in the realm of pipeline construction, especially in the realm of pipelines that are exposed to low temperatures ≤−160° C. This relates in particular to pipelines in which liquefied gas is transported.

BRIEF DESCRIPTION OF THE DRAWING

The FIGURE depicts the mean coefficient of thermal expansion at temperatures ranging from −165° C. to 200° C.; the reference temperature being 25° C.

DETAILED DESCRIPTION OF THE INVENTION

One particularly advantageous composition of variant 1 is as follows:

C 0.01-0.04%
S <0.01%
Cr 1.0-1.8%
Ni 35.5-37.5%
Mn 0.5-1.3%
Si max. 0.3%
ΣMo+W 1.5-3.0%
Ti 0.4-0.8%

Nb 0.4-0.8%
P <0.01%
Co 1.2-3.0%
Fe Remainder, including production-related impurities.

The following alloy composition is proposed for further reducing the expansion coefficient:

C 0.02-0.03%
S <0.01%
Cr 1.2-1.8%
Ni 36-37%
Mn 0.8-1.3%
Si max. 0.3%
ΣMo+W 1.5-2.5%
Ti 0.4-0.7%
Nb 0.4-0.7%
P <0.01%
Co 1.2-1.8%
Fe Remainder, including production-related impurities.

Finally, the following additional limitations to the individual elements are also conceivable with respect to the Variant 1 alloy:

Mo 1.2-1.8%, especially >1.5-<1.8%
W 0.3-0.8%, especially 0.4-0.7%
Co >1.4-1.7%

One particularly advantageous composition of Variant 2 is as follows:

C 0.01-0.04%
S <0.01%
Cr 1.0-1.8%
Ni 35.5-37.5%
Mn 0.5-1.3%
Si max. 0.3%
Al 1.0-1.8%
Ti 0.4-0.8%
Nb 0.4-0.8%
P <0.01%
Co 1.2-3.0%
Fe Remainder and production-related impurities.

The following alloy composition is proposed for further reducing the expansion coefficient:

C 0.02-0.03%
S <0.01%
Cr 1.2-1.8%
Ni 36-37%
Mn 0.8-1.3%
Si max. 0.3%
Al 1.0-1.5
Ti 0.4-0.7%
Nb 0.4-0.7%
P <0.01%
Co 1.2-1.8%
Fe Remainder and production-related impurities.

Finally, the following additional limitation to the individual elements are also conceivable with respect to the Variant 1 alloy:

Al 1.1-1.4%
Co 1.4-1.7%

Depending on the application and composition of the two variants, mean expansion coefficients $<4.5\times10^{-8}$/K can be attained between room temperature and temperatures ≤−165° C.

Table 1 in the following provides actual value analyses for test batches (LB 1110. LB 1165, and LB 1107) for both alloys, test batch LB 1107 being an Al-containing alloy (variant 2) in accordance with claim 2.

| Element | LB 1110 | LB 1165 | LB 1107 |
|---|---|---|---|
| C | >0.022 | 0.002 | >0.017 |
| S | 0.002 | 0.002 | 0.0014 |
| N | 0.001 | 0.003 | 0.001 |
| Cr | >1.48 | 1.45 | <1.45 |
| Ni | 35.76 | 36.06 | 36.11 |
| Mn | >0.99 | 0.95 | >1.0 |
| Si | 0.04 | <0.01 | 0.01 |
| Mo | >1.54 | 1.56 | 0.02 |
| W | 0.71 | 0.65 | 0.01 |
| Ti | >0.45 | 0.54 | 0.49 |
| Cu | 0.01 | 0.01 | 0.01 |
| Fe | R 56.831 | 56.15 | R 57.5382 |
| P | 0.003 | 0.003 | 0.002 |
| Al | >0.037 | 0.005 | >1.27 |
| Mg | 0.0005 | <0.001 | 0.0005 |
| Ca | 0.0005 | <0.0002 | 0.0005 |
| Zr | 0.01 | <0.001 | 0.01 |
| Co | >1.53 | 1.54 | >1.49 |
| B | 0.001 | <0.001 | 0.001 |
| Nb | 0.55 | 0.46 | 0.53 |

Rods that were 2.4 mm in diameter were produced from these alloys.

Welded joints were created with the rods using the WIG method, with sheet t=5 mm made of Pernifer 36 and welding material specimens. The laboratory batches were as follows:

| Material | Laboratory batch | Test item | Type of test |
|---|---|---|---|
| Variant 2 | LB1107 | 2813 | Welded joint |
| Variant 2 | LB1107 | 2809 | Welding material |
| Variant 1 | LB1110 | 2757 | Welded joint |
| Variant 1 | LB1165 | 2854 | Welded joint |
| Variant 1 | LB1165 | 2828 | Welding material |

In addition to metallographic examinations, the thermal expansion coefficient behavior and the mechanical properties were examined.

The mean coefficient of thermal expansion (CTE) was determined for specimens from cast blocks LB 1110 and LB 1107 in the temperature range between −163° C. and 200° C.

The following examinations were performed on the welding material specimens:

- notched bar impact work at −196° C. in the welding material, on the fusion line, and in the weld heat affected zone, each at a distance of 2 mm and 5 mm from the fusion line for all three specimens;
- notched bar impact work of welding material at room temperature on three specimens;
- tensile test on two welding material specimens, each test at −196° C. and at room temperature.

The following examinations were performed on the welded joints:

- bending test with root in direction of tension and face in the direction of tension with a bend radius of 2×d
- tensile tests at room temperature at −196° C., each with specimen positioned transverse to the weld line.

The tensile tests for the welded joints were performed on flat bar tension specimens, and the tests for the welding material were performed on round specimens.

Results

1. Coefficient of Thermal Expansion

The mean coefficient of thermal expansion of both inventive alloys for selected temperatures is provided for comparison in Table 2. The FIGURE depicts the curves of the CTE across the entire temperature range relative to the reference temperature 25° C.

TABLE 2

| Comparison of mean coefficients of thermal expansion for the investigated alloys at selected temperatures. | | | |
|---|---|---|---|
| Materials/batch | −165° C.-25° C. | 25° C.-100° C. | 25° C.-200° C. |
| Variant 2/LB 1107 | $4.12 \times 10^{-6}$ | $6.02 \times 10^{-6}$ | $9.04 \times 10^{-6}$ |
| Variant 1/LB 1110 | $3.89 \times 10^{-6}$ | $4.56 \times 10^{-6}$ | $5.54 \times 10^{-6}$ |

The CTE is clearly less than $5\times10^{-8}$/K in the lower temperature range.

Due to the mixing of the basic material in the welding material, it can be assumed that the mean expansion coefficient in the welding material of WIG or plasma welding joints is even lower.

2. Mechanical Properties

High fracture toughness at low temperatures is an important factor in selecting the basic material Ni36 for low temperature applications. Therefore, it is important that high levels of toughness are also attained in the welding material and welded joint.

The welding material, weld line, and weld heat affected zone were tested at distances of 2 mm and 5 mm from the fusion line at a material temperature of −196° C. The value for the notched bar impact toughness 5 mm from the fusion line represents the basic material, because the effect of heat from welding is negligible here.

The notch location in the welding material was also tested at room temperature.

Fracture toughness is fundamentally high. Comparing the values demonstrates that the toughness of the Variant 2 welding material (2809) is only about 30% lower than that of the basic material, and the toughness of the Variant 1 welding material (2828) is a bit higher. No rupture is detected at the fusion line, and certainly not in the weld heat affected zone. Table 3 provides the essential results.

The ductility of these welding materials is very high compared to the results of WIG welds with other known welding fillers with adapted coefficients of thermal expansion.

Round and Flat Bar Tension Tests:

Table 4 provides the results of tensile tests on round bar specimens made of the welding material. The focus here is in particular on the strength values found at room temperature, because strength increases at lower temperatures so that strength demands that are satisfied at room temperature are always also satisfied at lower temperatures.

The yield point for sample 2809 is more than 100 MPa above that of the basic material, while that of welding material 2828 is somewhat lower, at 350 MPa.

TABLE 4

| Results of round bar tensile tests on welding material. Typical values for basic material Ni36 are provided for the purpose of comparison. | | | | | |
|---|---|---|---|---|---|
| | Variant 2, Specimen 2809 | | Variant 1, Specimen 2828 | | Basic material Ni36, typical values |
| RT | | | | | |
| $R_{p0.2}$ [MPa] | 387 | 385 | 351 | | 270 |
| $R_m$ [MPa] | 524 | 531 | 486 | | 450 |
| $A_5$ | 28 | 27 | 26 | | 30 |
| −196° C. | | | | | |
| $R_{p0.2}$ [MPa] | 648 | 661 | 596 | 585 | 550 |
| $R_m$ [MPa] | 859 | 864 | 831 | 853 | 850 |
| $A_5$ | 30 | 34 | 26 | 33 | 30 |

The low temperature strength values, in particular the yield point of the welding material made of LB 1107, are also clearly greater than the values for the basic material.

The high expansion values document the ductility of the additive materials down to very low temperatures.

One important feature of the inventive materials is the shift in the fracture location for welded joints at room temperature from the welded material to the basic material. The flat bar tensile tests on the welded joints demonstrate that this goal was reliably attained. Since the specimens are fractured in the basic material, the measured strength also corresponds fairly precisely to that of the basic material.

The fracture appears in the welding material at low temperatures, but at a level that is very close to the strength of the basic material; this is different from welds with similar additives in which the welded joint is clearly not as strong.

TABLE 3

| Notched bar impact work and toughness of tested welded joints | | | | | | |
|---|---|---|---|---|---|---|
| | Variant 2, LB 1107, Specimen 2809 | | | Variant 1, LB 1165, Specimen 2828 | | |
| −196° C. | | | | | | |
| Welding material | 61 J<br>163 J/cm² | 62 J<br>155 J/cm² | 55 J<br>138 J/cm² | 72 J<br>186.4 J/cm² | 67 J<br>173.4 J/cm² | 70 J<br>182.5 J/cm² |
| | Mean: 59 J/148 J/cm² | | | Mean: 70 J/174 J/cm² | | |
| Fusion line | 85 J<br>213 J/cm² | 87 J<br>218 J/cm² | 82 J<br>205 J/cm² | 249 J<br>311 J/cm² | 228 J<br>285 J/cm² | 241 J<br>301 J/cm² |
| | Mean: 86 J/212 J/cm² | | | Mean: 239 J/299 J/cm² | | |
| Fusion line + 2 mm | 100 J<br>250 J/cm² | 100 J<br>250 J/cm² | 92 J<br>230 J/cm² | 254 J<br>317 J/cm² | 231 J<br>289 J/cm² | 250 J<br>313 J/cm² |
| | Mean: 97 J/243 J/cm² | | | Mean: 245 J/306 J/cm² | | |
| Fusion line + 5 mm | 93 J<br>233 J/cm² | 96 J<br>240 J/cm² | 90 J<br>225 J/cm² | 246 J<br>307 J/cm² | 225 J<br>281 J/cm² | 228 J<br>284 J/cm² |
| | Mean: 93 J/233 J/cm² | | | Mean: 233 J/291 J/cm² | | |
| RT | | | | | | |
| Welding material | 72 J<br>180 J/cm² | 81 J<br>205 J/cm² | 71 J<br>178 J/cm² | 82 J<br>212 J/cm² | 80 J<br>205 J/cm² | 74 J<br>189 J/cm² |
| | Mean: 75 J/187 J/cm² | | | Mean: 79 J/197 J/cm² | | |

TABLE 5

Results of flat bar tests on welded joints

| | Variant 2, Specimen 2813 | | | Variant 1, Specimen 2628 | | |
|---|---|---|---|---|---|---|
| RT | | | | | | |
| $R_{p0.2}$ [MPa] | 278 | 283 | 276 | 270 | 278 | 279 |
| $R_m$ [MPa] | 452 | 450 | 444 | 437 | 446 | 441 |
| $A_5$ | 34 | 33 | 33 | 36 | 32 | 34 |
| Fracture location | GW | GW | GW | GW | GW | GW |
| −196° C. | | | | | | |
| $R_{p0.2}$ [MPa] | 588 | 581 | 611 | 542 | 554 | 589 |
| $R_m$ [MPa] | 822 | 820 | 819 | 830 | 813 | 834 |
| $A_5$ | 22 | 23 | 34 | 23 | 23 | 23 |
| Fracture location | SG | SG | SG | SG | SG | SG |

GW: Basic material
SG: Welding material

Bending Tests:

All of the bending specimens—face or root in tensile stress—could be bent to a bending angle of 180° without cracks.

Metallographic Examinations:

For examining martensite resistance, the welding material specimens were cooled to −196° C. for one hour and then etched for martensite. No martensite could be found. This is also confirmed by the measurements of the coefficients of linear expansion, the temperature curve of which did not exhibit any anomalies.

The invention claimed is:

1. A welding additive material comprising a solid solution-strengthened iron-nickel alloy that has a high level of ductility and an expansion coefficient <4.5×$10^{-6}$/K in the temperature range between room temperature and −200° C., the alloy comprising, in weight %:

C 0.02-0.03%
S <0.01%
Cr 1.2-1.8%
Ni 35-37%
Mn 0.8-1.3%
Si max. 0.3%
ΣMo+W 1.5-2.5%
Ti 0.4-0.7%
Nb 0.4-0.7%
P <0.01%
Co 1.2-1.8%
Fe Remainder and production-related impurities.

2. A welding additive material comprising a solid solution-strengthened iron-nickel alloy with a high level of ductility and an expansion coefficient <4.5×$10^{-6}$/K in the temperature range between room temperature and −200° C., the alloy comprising, in weight %:

C 0.005-0.03%
S <0.01%
Cr 1.2-1.8%
Ni 36-37%
Mn 0.8-1.3%
Si max. 0.3%
Al 1.0-1.5%
Ti 0.4-0.7%
Nb 0.4-0.7%
P <0.01%
Co 1.2-1.8%
Fe Remainder and production-related impurities.

3. The welding additive material in accordance with claim 1, wherein content of the following in the alloy is, in weight %:

Mo 1.2-1.8%
W 0.3-0.8%, with the proviso that ΣMo+W is ≤2.5% U.

4. The welding additive material in accordance with claim 3, wherein content of the following in the alloy is, in weight %:

Co >1.4-1.7%.

5. The welding additive material in accordance with claim 1, wherein content of the following in the alloy is, in weight %:

Mo >1.5% and <1.8%
W 0.4-0.7%.

6. The welding additive material in accordance with claim 5, wherein content of the following in the alloy is, in weight %:

Co >1.4-1.7%.

7. The welding additive material in accordance with claim 1, wherein content of the following in the alloy is, in weight %:

Co >1.4%-1.7%.

8. The welding additive material in accordance with claim 2, wherein content of the following in the alloy is, in weight %:

Al 1.1 and 1.4%.

9. The welding additive material in accordance with claim 2, wherein the content of the following in the alloy is, in weight %:

Co 1.4 and 1.7%.

10. An iron-nickel alloy article comprising a weld including the welding additive material of claim 1 or 2.

11. An article according to claim 10, wherein the iron-nickel alloy of the welding additive material has a nickel content of 36%.

12. The iron nickel alloy article in accordance with claim 10, wherein the iron nickel alloy article is a pipeline for transporting liquefied gas.

13. An article including the welding additive material of claim 1 or 2, wherein low temperature strength values of the welding additive material are greater than for the rest of the article.

14. The welding additive material in accordance with claim 1 or 2, wherein the alloy has an expansion coefficient <4.5×$10^{-6}$/K in a temperature range between room temperature and −165° C.

15. A metal article having a weld including the welding additive material of claim 1 or 2.

16. A method of welding articles constituted of iron-nickel alloy, comprising MSG, WIG or plasma welding with a welding additive material of claim 1 or 2.

17. A method in accordance with claim 16, wherein the iron-nickel alloy of the welding additive material has a nickel content of 36%.

* * * * *